Nov. 16, 1937.  M. C. HARLEY  2,099,362
AIRCRAFT LAMP
Filed Dec. 12, 1934  4 Sheets-Sheet 2

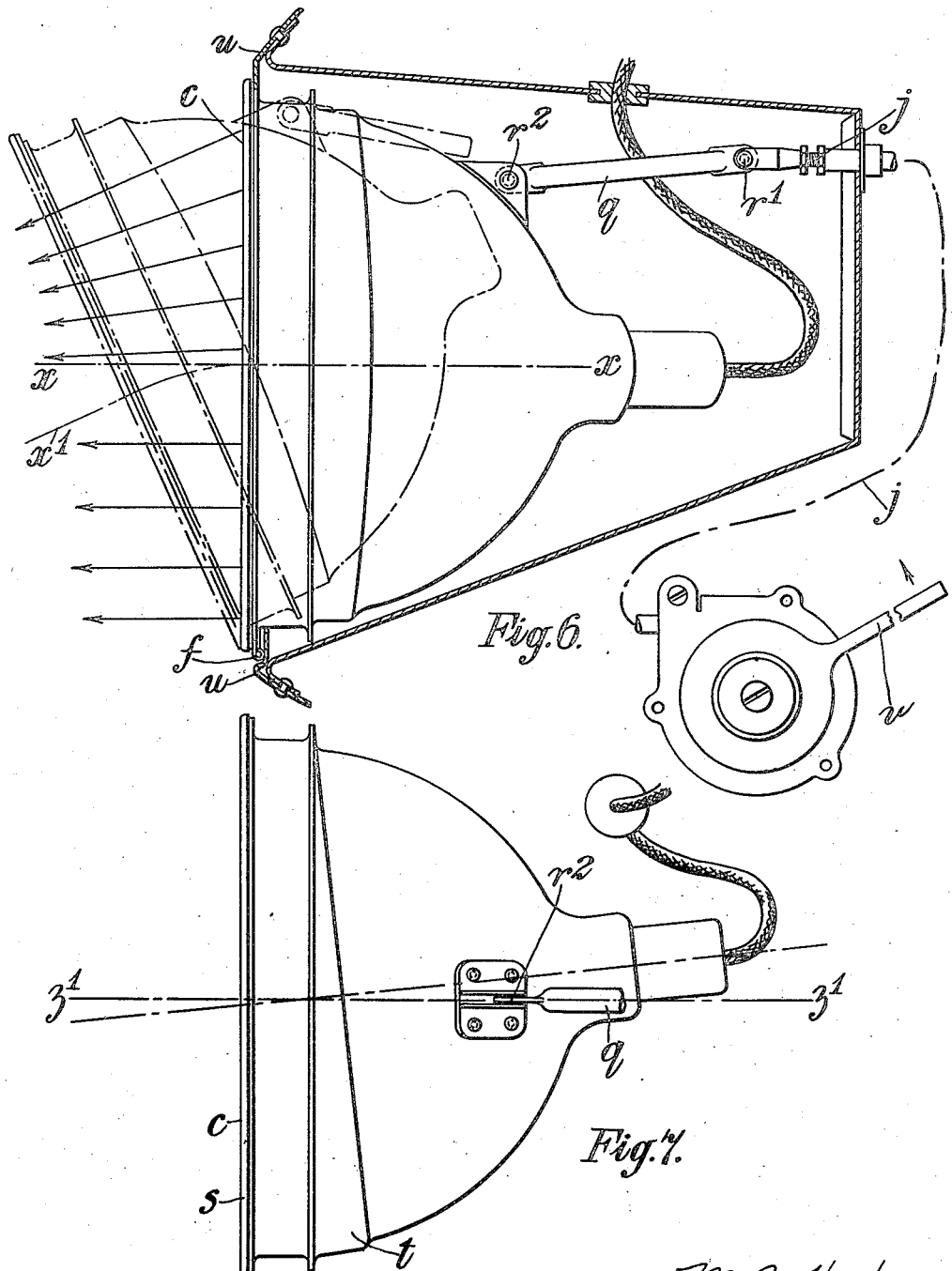

Patented Nov. 16, 1937

2,099,362

UNITED STATES PATENT OFFICE 2,099,362

AIRCRAFT LAMP

Maldon Cavendish Harley, Cranford, England

Application December 12, 1934, Serial No. 757,226
In Great Britain December 14, 1933

1 Claim. (Cl. 240—7.7)

This invention relates to and has for its object improvements in illuminating devices, in particular for use with aircraft, for assisting night flying and such purposes.

A number of requirements have to be met in such connections, such as minimizing of weight and wind resistance, the rigid support of the lamp and the provision of effective means for adjustment of its position to cause the light beam to be thrown in the desired direction, the last having to be capable of control from the cockpit or the like of the machine.

In particular, the invention aims at providing highly effective illumination of the ground at the time of landing and taking off in order that near objects, e. g. substantially below, and objects some distance ahead of the craft, may be illuminated in such a way as facilitates the safe performance of these operations. This I have found, in addition to the provisions mentioned above, renders very desirable the use of a lamp having characteristics differing from those of an ordinary lamp, e. g. one producing a substantially parallel beam of light as by the aid of a parabolic reflector, and in some cases introducing a more or less fortuitous dispersion of light.

According to the invention, the above requirements are met by means set out hereinafter.

Broadly stated, the invention consists in an illuminating device for aircraft, comprising a lamp for emitting a partly spread beam of light and a mounting for said lamp directing the said beam substantially forward of the aircraft, said mounting affording angular movement of the said beam in a plane substantially vertical in relation to the aircraft.

It also consists in a device as indicated in which the lamp emits a light beam in contiguous portions respectively substantially parallel to the lamp axis and divergent from such axis, and the mounting so directs the axis that the divergent portion is thrown downwardly.

The required beam characteristic is obtainable by using a lamp front acting refractively upon part of a substantially parallel light beam to deflect such part from (e. g. across) the axis of the lamp.

The mounting for said lamp is preferably one affording angular movement in a substantially vertical plane embracing a position in which the lamp axis is directed substantially forward of the aircraft, said mounting being provided on an aerofoil of the aircraft in proximity to a chamber, pocket or other recess formed in said aerofoil in the angular path of said movement of the lamp, the latter being movable into and out of such recess according to requirements, or in some cases permanently at least in part housed in such recess, though angularly movable therein.

Thus, a lamp of the desired construction may be arranged as to be retractable from operative position into an aerofoil, such as the underside of a wing. Conveniently this is accomplished by hinging a forward portion of the lamp to the wing or the like and providing accommodation for raising or lowering the lamp about such hinge from a position inside the wing or the like to a position such that the lamp front is more or less in a vertical plane. Means are provided so that the lamp may occuppy any intermediate position to throw the beam in the required direction and the whole is so provided that in all positions the lamp is rigidly held so as to partake only of the movements of the aircraft as a whole. The adjustment means is readily operable from the cockpit and preferably comprises a Bowden wire control adapted for smooth action and into which friction (preferably adjustable) is introduced for positioning the lamp. In the preferred form to be described, the rigidity required is obtained with remarkable lightness of parts.

Referring to the accompanying drawings:—

Figures 1a and 1b are fragmental sectional views of details in Figure 1.

Figures 6 and 7 are respectively a part sectional elevation and a plan of an alternative lamp and mounting construction.

Figure 1:
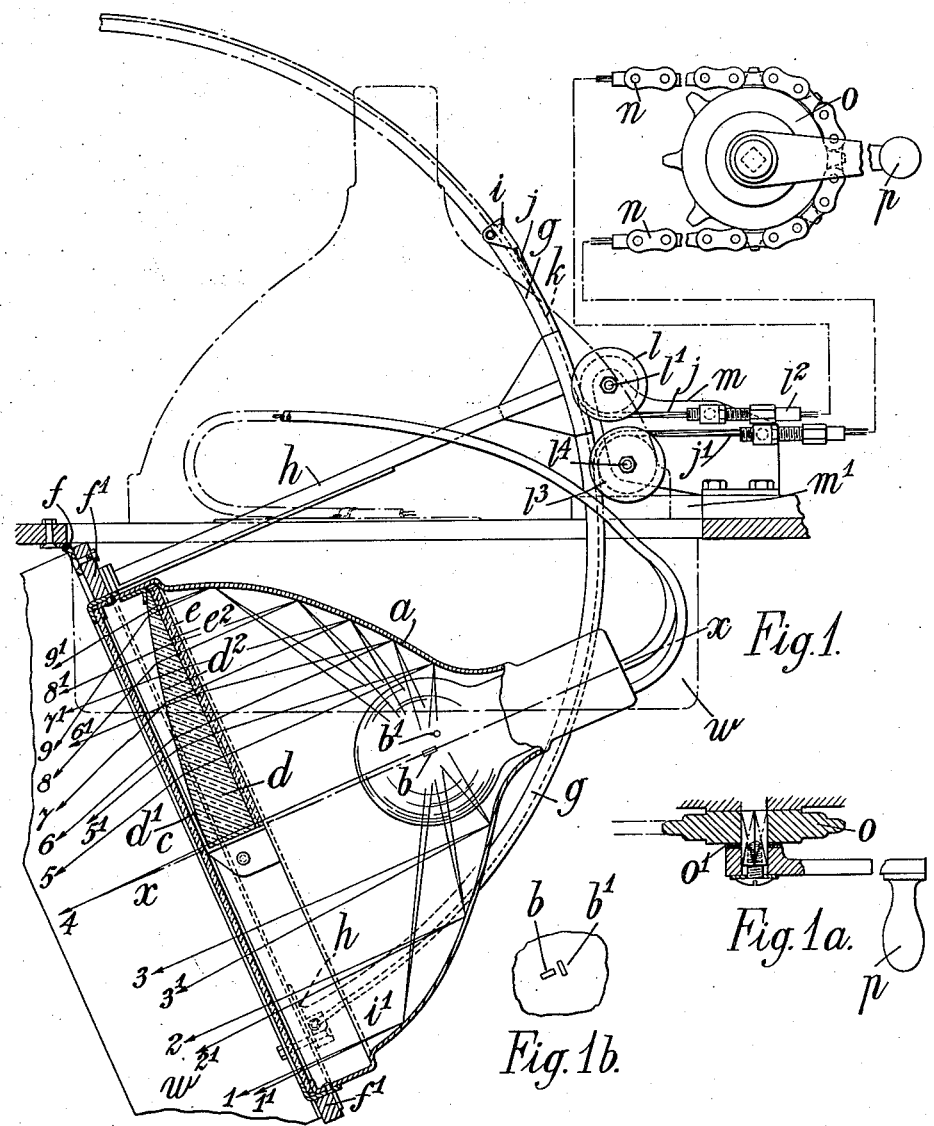
Figure 1 is a vertical section of an aircraft lamp and mounting in accordance with the invention, showing the lamp in retracted and exposed positions.
Figure 2:
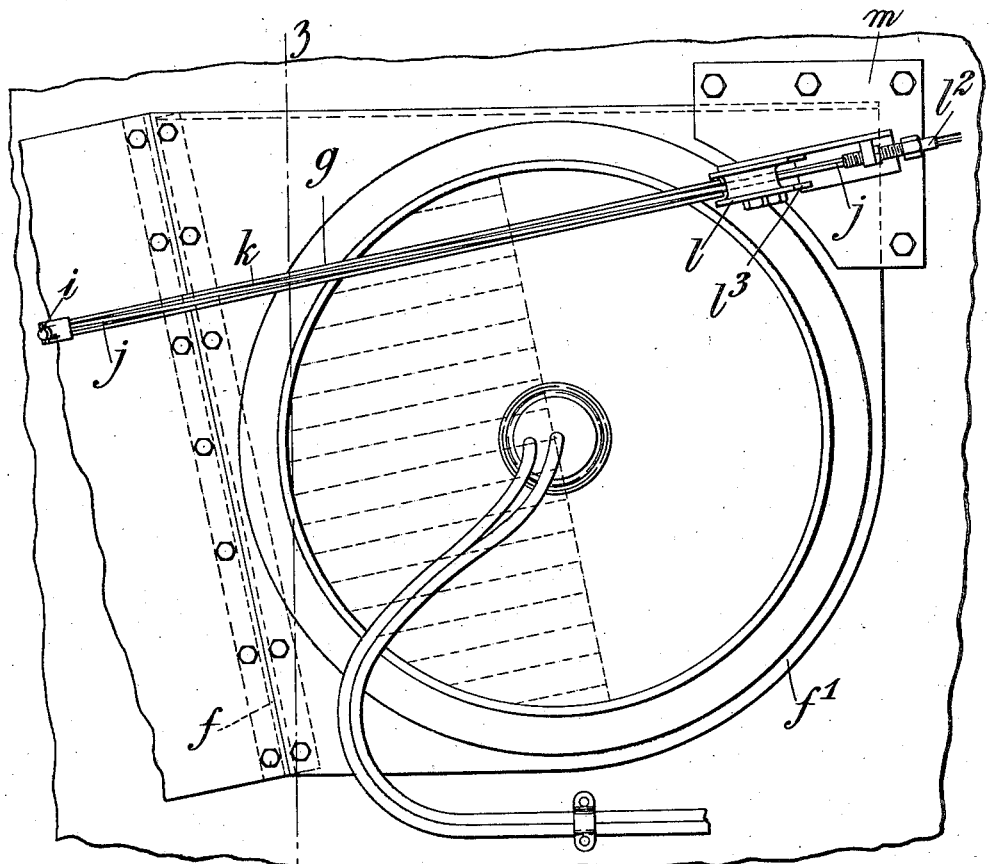
Figure 2 is a plan of the device shown in Figure 1; showing also how the beam can be offset in relation to the longitudinal axis of the aircraft.
Figure 3:
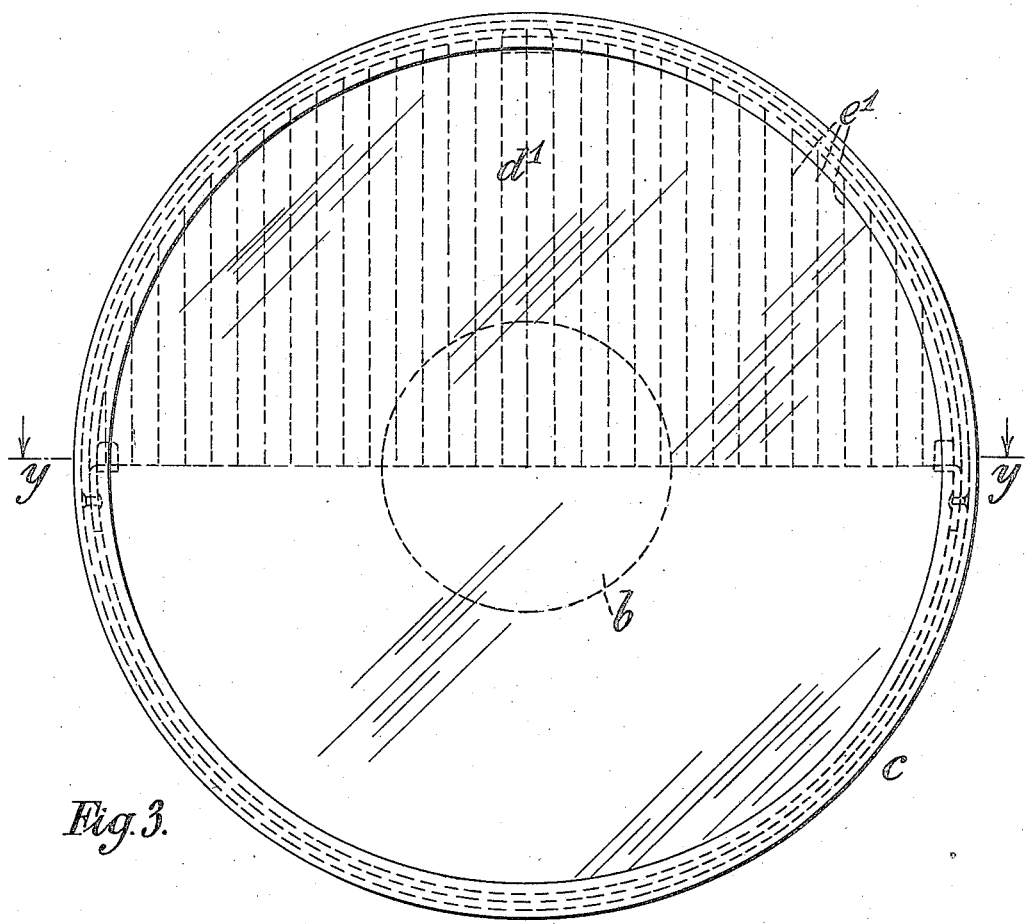
Figures 3 and 4 are respectively a front elevation of a preferred lamp construction and a sectional plan of a lens device productive of desirable beam characteristics; the paths of light rays being indicated in Figures 1 and 3.
Figure 4:
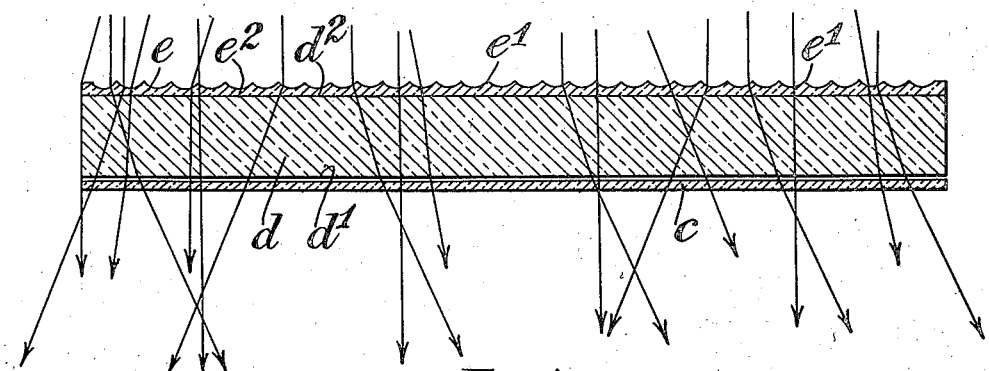

A preferred construction of lamp is shown in Figures 1 to 3 of the drawings and affords the characteristics found to be of special utility. According to this construction light rays 4, 5, 6, 7, 8 and 9 comprising part of a substantially parallel projected beam from the focal source $b$ and substantially parabolic reflector $a$ and disposed in the half of said beam to one side of a plane $y, y$ containing the axis $x, x$ of said beam, are subjected by refractive means both to deflection in relation to said plane and to dispersion laterally thereof, while the rays 1, 2, 3 of the remaining half of the beam are substantially unrefracted from their approximate parallelism.

The deflection referred to is produced by a special prismatic construction comprising two elements $d$ and $e$ each of which is of semicircular elevation, and lies to the upper side of the diameter $y, y$. The element $d$ acts as a plano-cylindrical astigmatic lens of long focus, its surfaces $d'$, $d^2$ converging away from the line $y, y$ to a region on the circumference of the lamp casing or rim of the reflector centrally above the axis $x, x$. The element $e$ which acts as a diffuser comprises a piece of glass having one face $e^2$ adjacent the inner flat face $d^2$ of the element $d$ and its other face shaped to form a number of parallel ribs $e'$, $e'$ which are defined by substantially cylindrical depressions or curves providing inclined facets running normally to the line $y, y$. The face $e^2$ of the diffuser is flat and adapted to contact with the flat surface of the deflector $d$, and these surfaces may be cemented or otherwise secured together. Alternatively the two elements can be integral. Under the action of the prismatic elements $d$ and $e$ rays such as 4, 5, 6, 7, 8 and 9 are deflected downwardly as shown in Figure 1 so as to pass through the plane containing the axis $x, x$ and the diameter $y, y$ and these rays are also refracted or diffused laterally.

The emerging light beam thus comprises a parallel or substantially unrefracted beam from the lower half which serves for distant illumination and is crossed by a beam from the upper half, which second beam provides a large area flood light for immediate surroundings. Further, the two beams are contiguous and graduate into one another obviating non-illuminated areas within the range of the lamp.

The construction specifically described may, of course, be differed from provided a beam of characteristics similar to those above indicated is obtainable.

A lamp so constructed is mounted on the aircraft in such a way that the said plane $y, y$ when the lamp is in an operative position extends horizontally or substantially so and it can be moved so that the axis $x, x$ of the lamp points ahead of the aircraft and more or less parallel with the ground, the latter effect being produced by swivelling the lamp about a hinge or other transverse axis to the extent required having regard to the changes of angle of the aircraft in approaching or leaving the ground.

Figure 5:
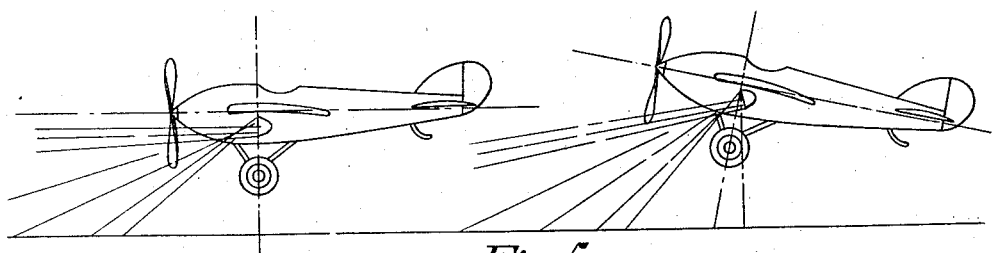
Figure 5 is a diagrammatic elevation of an aeroplane in typical landing (right-hand view) and take-off (left-hand view) positions, utilizing an illuminating device according to this invention.

The spread of the portion of the light beam composed of rays such as 4, 5, 6, 7 and 8 produces a wide area of illumination of the ground below and extending in front of the aircraft to merge into the distance beam, the area thus illuminated, as can be seen from Figure 5, not being so noticeably altered in position or configuration in relation to the aircraft by the raising or lowering of the nose of the latter (such as takes place in negotiating a landing or a take-off) as to be objectionable. Such dipping or raising of the beam as may be an advantage during such operations, primarily for properly directing the more or less parallel distance-illuminating beam, is provided for by mounting and control devices of the kind to be described.

In a preferred construction, the lamp is so mounted on a perforated flap $f'$ having a hinge $f$ as to be angularly movable in a substantially vertical plane extending substantially forward of the aircraft, e. g. so as to rise and fall from a position under an aerofoil or wing with its axis $x, x$ more or less horizontal to a position in which its front $c$ or the flap $f'$ to which the latter is secured lies flush with the underside of such wing, the lamp body being then concealed in a recess within the thickness of the wing.

Preferably the movement of the lamp between such positions is effected by a quadrantal member $g$ attached by bracket means $h$ to and embracing the back of the lamp from the plane of the flap and the front $c$ to a point $i$ positioned somewhat beyond a plane at right angles to the first plane and passing through the hinge from which the quadrant is struck. For a wing mounting such quadrant with the lamp withdrawn into its recess may if necessary be partly accommodated in a special local fairing (not shown) of small size protruding from the upper side of the wing. A convenient way of operating the lamp through the attached quadrant is by means of a Bowden. Thus, a wire $j$ fixed at the point $i$ at one end of the quadrant and accommodated in a peripheral groove $k$ may pass round a grooved guide wheel $l$, mounted on a horizontal axis $l'$ on a bracket or the like $m$ secured to the frame, e. g. a spar or the like in close proximity to the quadrant periphery, and thence through flexible guide tubing $l^2$ (and a further guide wheel or wheels if necessary) to a length of chain $n$. The latter passes round a sprocket wheel $o$ conveniently situated in the cockpit and has its other end attached to another length of wire $j'$ which returns under suitable tension to a fixing point $i'$ at the other end of the lamp quadrant $g$ via a second guide pulley arrangement $l^3$, $l^4$ of the kind described. Rotation of the sprocket wheel $o$ by a handle $p$ or the like displaces oppositely the two wires $j, j'$ attached respectively to the opposite ends of the lamp quadrant and provides a very smooth acting means of swinging the lamp and generally adjusting its position.

For holding the lamp in its extreme or any intermediate positions, the sprocket mounting conveniently comprises a spring loaded member, e. g. a washer $o'$ (see Figure 1a) or the like, or other well known devices may be included in the operating system for introducing substantial friction regulatable in some such manner as is shown. It will be noted that the mounting $m'$ for the bracket part $m$ acts as a stop for the lamp-carrying flap by overhanging the recess or aperture at one corner thereof.

If desired other means may be evolved for operation of the lamp but a quadrant of considerable size is important for obtaining the required rigidity. A duplication of quadrants may, however, be provided. The quadrant may be toothed and operated by a pinion rotatable from the cockpit, but the light wire device above described is preferred on account of its lightness and cheapness and its positive and smooth action.

It will be understood that the lamp may be mounted in any position on the machine, e. g. under the fuselage, so as to be retractable thereinto, and/or it may if desired be offset, i. e. so as, if necessary, to throw its beam obliquely in relation to the axis of the machine. Offsetting can be obtained in the manner illustrated in Figure 2, by setting the hinge $f$ oblique in relation to a line Z—Z transverse of the longitudinal axis of the aircraft.

In a modification shown in Figures 6 and 7 the lamp partakes of a smaller but sufficient angular movement, for example, between positions with the axis directed substantially horizontal and dipped from this position by some 30°. Here the lamp body is housed in a chamber or recess situated for example in a nose fairing $u$ of an aircraft and the lamp is hinged to the aircraft at the mouth of said chamber. The rocking device comprises a Bowden cable operated for example from the cockpit by any suitable control such as V, the cable being introduced at the back of the chamber and the wire $j$ being connected by a rod $q$ to the lamp body through the pivotal connections $r'$, $r^2$. In Figure 7 it will be seen that lateral offset of the lamp axis in relation to the centre line $z'$, $z'$ of the aircraft is obtained by interposing between the lamp proper and a rim $s$ carrying the front glass $c$ a tapering distance piece $t$. For the desired beam characteristics the lamp may be provided with a lens substantially as already described.

Preferably a shadow bar $w$ or the like is provided, say at one side of the lamp and dropping therewith as in Figure 1, below the wing or adjacent part to shield the light beam, as desirable, from the body or other part of the machine which it is not desired to illuminate.

Referring to Figures 1 to 4 and to the lamp which can be used apart from other devices herein described, in addition to the filament $b$ at the focal point of the parabolic reflector a second filament $b'$ is provided, to provide an emergency light in the event of failure of the principal filament, a serious matter in night flying. One cannot practically provide two filaments to contain the focal point; therefore the position of the filament $b'$ is of importance and it should be related substantially as shown to both the filament $b$ and the reflector surface to obviate material departure of the characteristics of emergency beam from those of the normal beam.

The preferred position for the emergency filament $b'$ is as shown (see also Figure 1b), viz. somewhat above the plane $y, y$ containing the axis $x, x$ and behind the main filament (about $\frac{3}{16}''$ each way in the case of an 8" lamp), it having been found that the inevitable alterations in the beam characteristic when the emergency light is in action are a general lateral spreading of the entire beam (see Figure 4), a slight vertical dipping of the beam emerging from the lower half of the lamp front (see Figure 1, rays 1', 2', 3') and a slight upward scattering of the other half of the beam (see rays 4' to 9'), which latter is largely combated by the cylindrical face $d'$ of the deflecting element $d$.

It will be noted that in a single bulb coiled filaments are shown, the centre of length of the emergency filament lying in the same plane as the longitudinal axis of the main filament, that is in the vertical plane containing the lamp axis $x, x$.

I claim:—

A retractable lamp mounting for use on airplanes with wings, comprising an annular flap hingedly mounted on the under side of the wing, a lamp secured to said flap, the front of the lamp being substantially flush with the plane of the annular flap, a quadrantal member extending rearwardly of the lamp and secured at one end to the flap at a point removed from said hinge mounting, operating means cooperating with said quadrantal member for pivotally and reciprocally retracting and lowering the flap, said wing being provided on its under side with an opening for receiving the lamp when in its retracted position, and said operating means comprise a flexible cable secured to the ends of the quadrantal member, a pair of pulley wheels secured to and within the wing, between which the cable passes substantially forming a loop, means associated with the loop for operating the cable whereby the quadrantal member and lamp may be reciprocally retracted and lowered.

MALDON CAVENDISH HARLEY.